Dec. 16, 1969 D. L. BEEZLEY 3,484,618
VOLTAGE SEQUENCER
Filed Feb. 8, 1968
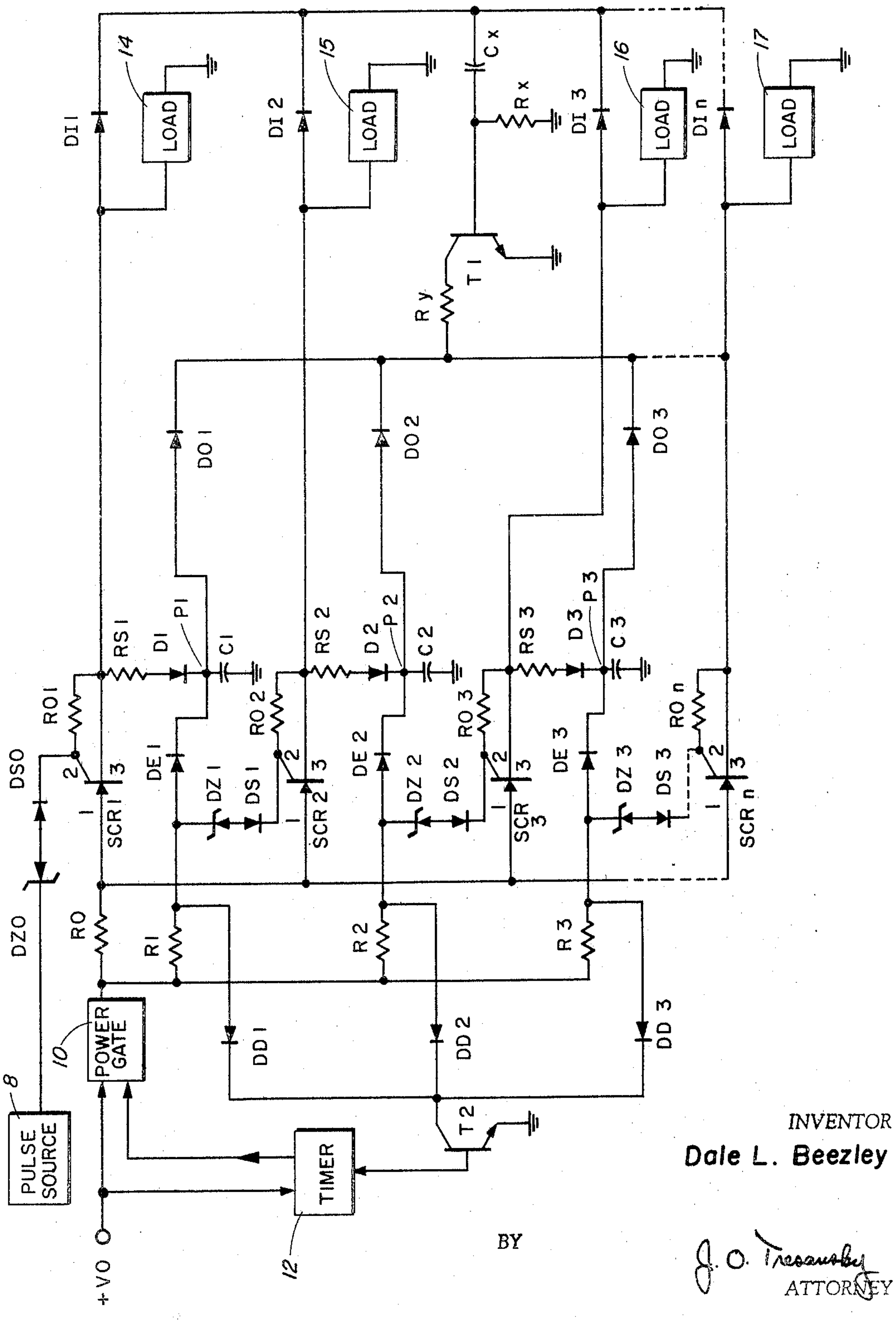
INVENTOR
Dale L. Beezley
BY
J. O. Tresansky
ATTORNEY United States Patent Office 3,484,618
Patented Dec. 16, 1969

3,484,618

VOLTAGE SEQUENCER

Dale L. Beezley, Sunnyvale, Calif., assignor, by mesne assignments, to the United States of America as represented by the Secretary of the Navy Filed Feb. 8, 1968, Ser. No. 704,068
Int. Cl. H02j *1/00, 3/00, 3/14*
U.S. Cl. 307—41 9 Claims

ABSTRACT OF THE DISCLOSURE

A voltage sequencer for switching a voltage sequentially to a plurality of *n* load devices. The sequential switching is effected by the charging rate of a plurality of $n-1$ memory capacitors. As a particular capacitor is allowed to charge, it will trigger an associated controlled rectifier which in turn energizes one of the *n* load devices. As the respective capacitors are sequentially charged, the *n* load devices become sequentially energized.

BACKGROUND OF THE INVENTION

This invention relates generally to circuitry for sequentially energizing a plurality of load devices and more particularly to a circuit for accurately sequentially energizing a plurality of load devices independently of considerable deterioration of voltage levels.

Previous electrical sequencer while generally performing satisfactorily used memory capacitors with the sequence action quite sensitive to the charge and hence voltage level present on the memory capacitors. As subsequent loads were sequenced, the voltage level tended to deteriorate considerably thereby causing eventual loss of sequence accuracy.

SUMMARY OF THE INVENTION

Accordingly, one object of this invention is to provide new and improved circuitry for sequentially energizing a plurality of load devices.

Another object of the instant invention is the provision of a new and improved circuitry for effecting accurate sequential energizing of a plurality of load devices independently of voltage level deterioration.

One further object of this invention is the provision of a new and improved circuit for sequentially energizing a substantially indefinite number of load devices.

Briefly, in accordance with this invention, these and other objects are attained by sequentially energizing a plurality of load devices by the use of controlled rectifiers. The controlled rectifiers control the sequencing operation by utilizing the charge rate of memory capacitors.

BRIEF DESCRIPTION OF THE DRAWING

A more complete appreciation of the invention and many of the attendant advantages thereof will be readily apparent as the same becomes better understood by reference to the following detailed description when considered in connection with the accompanying solitary view which illustrates a voltage sequencer according to the present invention.

DETAILED DESCRIPTION OF THE PREFERRED EMBODIMENT

Referring now to the drawing, the circuit is shown as consisting of a plurality of *n* silicon controlled rectifiers $SCR_1$, $SCR_2$, $SCR_3$ . . . $SCR_n$ each of which has a first, second and third terminal and is normally in the off condition. A voltage $+V_0$ is applied to the respective first terminal anodes of the silicon controlled rectifiers through a conventional power gate 10 and respective dropping resistors $R_0$, $R_1$ . . . $R_3$. Operation of the sequencing circuit is initiated by triggering the gate terminals two of silicon controlled rectifier $SCR_1$ with an initial pulse signal from a pulse source 8 through a zener diode $DZ_0$ and a diode $DS_0$. When silicon controlled rectifier $SCR_1$ is triggered, a load device 14 connected to the third terminal cathode thereof will become energized. Load device 14 is the first load device in the sequence of *n* load devices that are to be energized. Also, when silicon controlled rectifier $SCR_1$ is triggered, a capacitor $C_1$ tends to charge towards the load voltage through resistor $RS_1$ and diode $D_1$ which are serially connected to the third terminal cathode of silicon controlled rectifier $SCR_1$. Capacitor $C_1$ does not charge immediately because for a short time after silicon controlled rectifier $SCR_1$ is triggered a transistor $T_1$ is maintained in its initial saturation state by the output of silicon controlled rectifier $SCR_1$ which provides a base current to transistor $T_1$ through diode $DI_1$ and capacitor $C_x$. Thus, capacitor $C_1$ will not be able to charge until the time constant, $R_xC_x$, provided by resistor $R_x$ and capacitor $C_x$, both connected to the base of transistor $T_1$, allows transistor $T_1$ to come out of saturation. The $R_xC_x$ time constant is chosen to be considerably less than the on-time of silicon controlled rectifier $SCR_1$ thereby to give capacitor $C_1$ time to charge to the load voltage after an initial clamp at point $P_1$ through diode $DO_1$, connected to the collector of transistor $T_1$ through resistor $R_y$, is removed.

Immediately preceding the time at which the sequence is to advance to silicon controlled rectifier $SCR_2$ so as to energize the second load 15, a conventional timer 12 connected to power gate 10 inhibits the power gate until silicon controlled rectifier $SCR_1$ is turned off. During the time that silicon controlled rectifier SCR, is turned off, capacitor $C_1$ will store, by way of its charge voltage, the information that silicon controlled rectifier $SCR_1$ was the last silicon controlled rectifier to be turned on. This stored voltage charge on capacitor $C_1$ is trapped by the back biased diodes $D_1$ and $DE_1$ connected to capacitor $C_1$. At the time that the sequence is to be stepped forward to silicon controlled rectifier $SCR_2$, the timer 12, which is also connected to the base of a transistor $T_2$, will unclamp the transistor $T_2$ which initially has been maintained in a clamped saturated state. When transistor $T_2$ is unclamped, all the $n-1$ memeory capacitors $C_1$, $C_2$, $C_3$, etc. will begin to charge towards the line voltage $+V_0$ through the power gate 10 and serially and respectively connected resistors $R_1$, $R_2$, $R_3$, etc. and diodes $DE_1$, $DE_2$, $DE_3$, etc. The time constants $R_1C_1$, $R_2C_2$, $R_3C_3$, etc. are all set to be equal so that the rate of charge is the same for all the memory capacitors. Zener diodes $DZ_1$, $DZ_2$, $DZ_3$, etc. which are respectively connected between resistors $R_1$, $R_2$, $R_3$, etc. and diodes $DE_1$, $DE_2$, $DE_3$, etc. are all selected so as to have equal Zener voltages.

Diodes $DD_1$, $DD_2$, $DD_3$ etc. which are also respectively connected between resistors $R_1$, $R_2$, $R_3$, etc. and diodes $DE_1$, $DE_2$, $DE_3$, etc. prevent the respective Zener diodes from being triggered until transistor $T_2$ is unclamped. Zener diode $DZ_1$ will reach its Zener level considerably in advance of Zener diodes $DZ_2$, $DZ_3$, etc. because capacitor $C_1$ already has a voltage charge stored thereon, whereas the voltage charge on capacitors $C_2$ and $C_3$ was negligible. When Zener diode $DZ_1$ thus reaches its Zener voltage level, it will trigger silicon controlled rectifier $SCR_2$ which will, through diode $DI_2$, connected to the output of silicon controlled rectifier $SCR_2$, clamp all the $n-1$ memory capacitors $C_1$, $C_2$, $C_3$, etc. respectively at points $P_1$, $P_2$, $P_3$, etc. to ground level through respective diodes $DO_1$, $DO_2$, $DO_3$, etc. and transistor $T_1$. The timer 12 will then reclamp transistor $T_2$ to prevent any further triggering of the silicon controlled rectifiers before the sequence is again due to step. Now capacitor $C_2$ will charge toward the load voltage through serially connected resistors $RS_2$ and diode $D_2$ in accordance with the time constant $RS_2C_2$.

When a subsequent load is to be energized transistor $T_2$ will again be unclamped and the above procedure repeated. Other than the power drain, there is virtually no limit to the number of load devices that may be sequential energized.

It should be noted that while the apparatus of the herein described invention provides for the sequential energization of a plurality of loads by using silicon controlled rectifiers that it is not so limited, and other controlled rectifiers, such as "gate controlled" and "gate transfer," may be equally used.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A voltage sequencer comprising:

a plurality of *n* switching devices, each of which is connectable to a respective one of a plurality of *n* load devices,

*n*—1 capacitive means, connected to the output of a respective one of said *n* switching devices, except the last, and means for sequentially applying energy to each of said *n* load devices, after a first load device has been energized, in accordance with the charge rate of said *n*—1 capacitive means.

2. A voltage sequencer as in claim 1 wherein each of said *n* switching devices is a silicon controlled rectifier.

3. A voltage sequencer comprising:

a plurality of *n* first switching devices, each of which is connectable to a respective one of a plurality of *n* load devices and each of which has a first, second, and third terminal;

*n*—1 capacitors;

means connecting each of said *n*—1 capacitors to the third terminal of a respective one of said *n* first switching devices, except the last;

means for applying a source of potential to the first terminal of each of said *n* first switching devices;

*n* second switching devices;

means connecting said *n* second switching devices to the second terminal of a respective one of said *n* first switching devices;

means for triggering the first of said second *n* switching devices thereby switching said first of said first *n* switching devices whereby said first of said *n* load devices is energized by said source of potential; and means for sequentially causing said second and subsequent of said second *n* switching devices to be triggered in accordance with the charge rate of respective ones of said *n*—1 capacitors thereby switching said second and subsequent of said first *n* switching devices whereby said second and subsequent of said *n* load devices are sequentially energized.

4. A voltage sequencer as defined in claim 3 wherein each of said *n* first switching devices is a silicon controlled rectifier.

5. A voltage sequencer as defined in claim 3 wherein each of said *n* second switching devices is a Zener diode.

6. A voltage sequencer as defined in claim 3 wherein said means for applying said potential comprises a power gate.

7. A voltage sequencer as defined in claim 3 wherein said means connecting said *n* second switching devices to said third terminal comprises a semiconductive device.

8. A voltage sequencer as defined in claim 3 wherein said means connecting each of said *n*—1 capacitors comprises a serially connected resistance means and semiconductor device.

9. A voltage sequencer as in claim 3 wherein said means for sequentially causing said second subsequent of said second *n* switching devices to be triggered comprises a first transistor, a second transistor, and a timer.

References Cited

UNITED STATES PATENTS 3,258,613 6/1966 Felcheck et al. ______ 307—41 X

ROBERT K. SCHAEFER, Primary Examiner

D. SMITH, Jr., Assistant Examiner